(12) United States Patent
Foo

(10) Patent No.: US 8,656,400 B2
(45) Date of Patent: *Feb. 18, 2014

(54) SYNCHRONISATION OF EXECUTION THREADS ON A MULTI-THREADED PROCESSOR

(75) Inventor: Yoong Chert Foo, London (GB)

(73) Assignee: Imagination Technologies, Ltd., Kings Langley, Hertfordshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/483,682

(22) Filed: May 30, 2012

(65) Prior Publication Data

US 2012/0240131 A1    Sep. 20, 2012

Related U.S. Application Data

(63) Continuation of application No. 11/895,618, filed on Aug. 24, 2007, now Pat. No. 8,286,180, which is a continuation-in-part of application No. 11/591,801, filed on Nov. 2, 2006, now abandoned.

(30) Foreign Application Priority Data

Jul. 4, 2006    (GB) .................................. 0613289.8

(51) Int. Cl.
G06F 9/46    (2006.01)
G06F 7/38    (2006.01)
G06F 9/44    (2006.01)

(52) U.S. Cl.
USPC ........... 718/102; 712/220; 712/233; 712/234; 717/129; 717/130

(58) Field of Classification Search
None
See application file for complete search history.

(56) References Cited

U.S. PATENT DOCUMENTS

| | | | | |
|---|---|---|---|---|
| 5,515,490 A | * | 5/1996 | Buchanan et al. | 715/209 |
| 5,797,004 A | * | 8/1998 | Lindholm et al. | 718/104 |
| 5,968,167 A | * | 10/1999 | Whittaker et al. | 712/225 |
| 6,718,484 B1 | * | 4/2004 | Kodera | 714/35 |
| 7,353,369 B1 | * | 4/2008 | Coon et al. | 712/234 |
| 7,584,342 B1 | * | 9/2009 | Nordquist et al. | 712/22 |
| 7,788,468 B1 | * | 8/2010 | Nickolls et al. | 712/22 |
| 7,861,060 B1 | * | 12/2010 | Nickolls et al. | 712/22 |
| 7,908,604 B2 | * | 3/2011 | Takayama et al. | 718/101 |
| 2006/0143361 A1 | * | 6/2006 | Kottapalli et al. | 711/100 |

* cited by examiner

Primary Examiner — Jennifer To
(74) Attorney, Agent, or Firm — Michael S. Garrabrants

(57) ABSTRACT

Method and apparatus are provided for a synchronizing execution of a plurality of threads on a multi-threaded processor. Each thread is provided with a number of synchronization points corresponding to points where it is advantageous or preferable that execution should be synchronized with another thread. Execution of a thread is paused when it reaches a synchronization point until at least one other thread with which it is intended to be synchronized reaches a corresponding synchronization point. Execution is subsequently resumed. Where an executing thread branches over a section of code which included a synchronization point then execution is paused at the end of the branch until the at least one other thread reaches the synchronization point of the end of the corresponding branch.

14 Claims, 3 Drawing Sheets

```
Instruction x
if (condition a) then
    sync point
    instruction y
end if
instruction z
```

```
Thread #0:
1 process instruction x
2 process if (condition a) (true) -> do nothing
3 encounter sync point, pauses (wait for sync start)

Thread #1:
1 process instruction x
2 process if (condition a) (false) -> jump to end if
3 branched over sync point, pauses (wait for sync end)

Thread #2
1 process instruction x
2 process if (condition a) (true) -> do nothing
3 encounter sync point, pauses (wait for sync start)

Thread #3:
1 process instruction x
2 process if (condition a) (false) -> jump to end if
3 branched over sync point, pauses (wait for sync end)

---equilibrium point---

Thread #0:
4 can resume processing - process instruction y
5 process instruction z Thread #2
4 can resume processing - process instruction y
5 process instruction z Thread #1
4 can resume processing - process instruction z Thread #3:
4 can resume processing - process instruction z
```

FIG. 3

SYNCHRONISATION OF EXECUTION THREADS ON A MULTI-THREADED PROCESSOR

CROSS REFERENCE TO RELATED APPLICATION

This application is a continuation of U.S. Ser. No. 11/895,618, filed Aug. 24, 2007, now U.S. Pat. No. 8,286,180, issued on Oct. 9, 2012, which is a continuation-in-part of U.S. Ser. No. 11/591,801, filed Nov. 2, 2006, abandoned, the disclosure of which is hereby incorporated by reference.

FIELD OF THE INVENTION

This invention relates to a method and apparatus for synchronisation of execution threads on a multi-threaded processor.

BACKGROUND OF THE INVENTION

In our U.S. Pat. No. 6,971,084, there is described a multi-threaded processor which has several threads executing at the same time. These threads may be executed at different rates as the processor allocates more or less time to each one. There will in such a system be a plurality of data inputs, each supplying a pipeline of instructions for an execution thread. A control means routes the execution thread to an appropriate data processing means which is then caused to commence execution of the thread supplied to it. A determination is made repeatedly as to which routing operations and which execution threads are capable of being performed and subsequently at least one of the operations deemed capable of being performed is commenced. The system may be modified by including means for assigning priorities to threads so that execution of one or more threads can take precedence over other threads where appropriate resources are available.

Systems embodying the invention of U.S. Pat. No. 6,971,084 will typically have a number of threads executing at the same time on one or more different processors. The threads may be executed at different rates as the processors on which they are executing allocate more or less time to them in accordance with resource availability.

In some applications it is desirable to coordinate execution of two or more threads such that sections of their programs execute simultaneously (in synchronisation) for example to manage access to shared resources. This can be achieved by the utilisation of a synchronisation point provided in an execution thread which a processing means recognises as a point at which it may have to pause. Each free running thread will execute up to a synchronisation point and then pause. When all threads are paused at a synchronisation point they are synchronised and can be restarted simultaneously.

As with all software, the execution threads may have flow control branches and loops within them and it is therefore not always possible to predict which execution path a thread will take through a program. Therefore if one thread branches and thereby avoids a synchronisation point, a thread with which it is intended to be synchronised may be stalled indefinitely at a corresponding synchronisation point. As the first thread is not executing that section of the program it will never reach the relevant synchronisation point.

Alternatively, in such a situation, one thread which has branched to miss a first synchronisation point may unintentionally synchronise with a second thread at a second synchronisation point. For example, if the thread includes a branch point "if . . . end" branch which contains a synchronisation point A within it, and a synchronisation point B after it, then threads which do not skip the "if . . . end" branch would pause at the synchronisation point A within the branch and those that do skip it would pause at synchronisation point B after the branch.

SUMMARY OF THE INVENTION

Preferred embodiments of the invention provide a method and apparatus for synchronisation of execution threads on a multi-threaded processor in which each thread is provided with a number of synchronisation points. When any thread reaches a synchronisation point it waits for other threads with which it is intended to be synchronised to reach the same synchronisation point and is then able to resume execution. When a thread branches over a section of code, which includes a synchronisation point, it is paused and flagged as having branched. Subsequently any threads which reach a synchronisation point wait only for threads which have not been flagged as having branched. This ensures that any threads which have not branched, synchronise with each other.

Threads which are paused at a branch target (i.e. after branching) are permitted to resume execution when any other thread reaches the same point through normal execution without branching. If all other threads have branched then execution resumes when all threads reach that branch target.

Preferably it is possible to predict at any branch point whether any synchronisation points will be missed if the branch is taken. If no synchronisation points are skipped then there is no requirement for the branching thread subsequently to pause.

BRIEF DESCRIPTION OF THE DRAWINGS

FIG. 3 shows a fragment of code used in an embodiment of the invention; and,

In FIG. 1, a plurality of data inputs 4 are provided to a media control core 2. Each data input provides a set of instructions for a thread to be executed. The media control core 2 repeatedly determines which threads are capable of being executed, in dependence on the resources available. The media control core 2 is coupled to a multi-banked cache 12 with a plurality of cache memories 14. This is used for storage of data which may be accessed by any of the executing threads.

Figure 1:
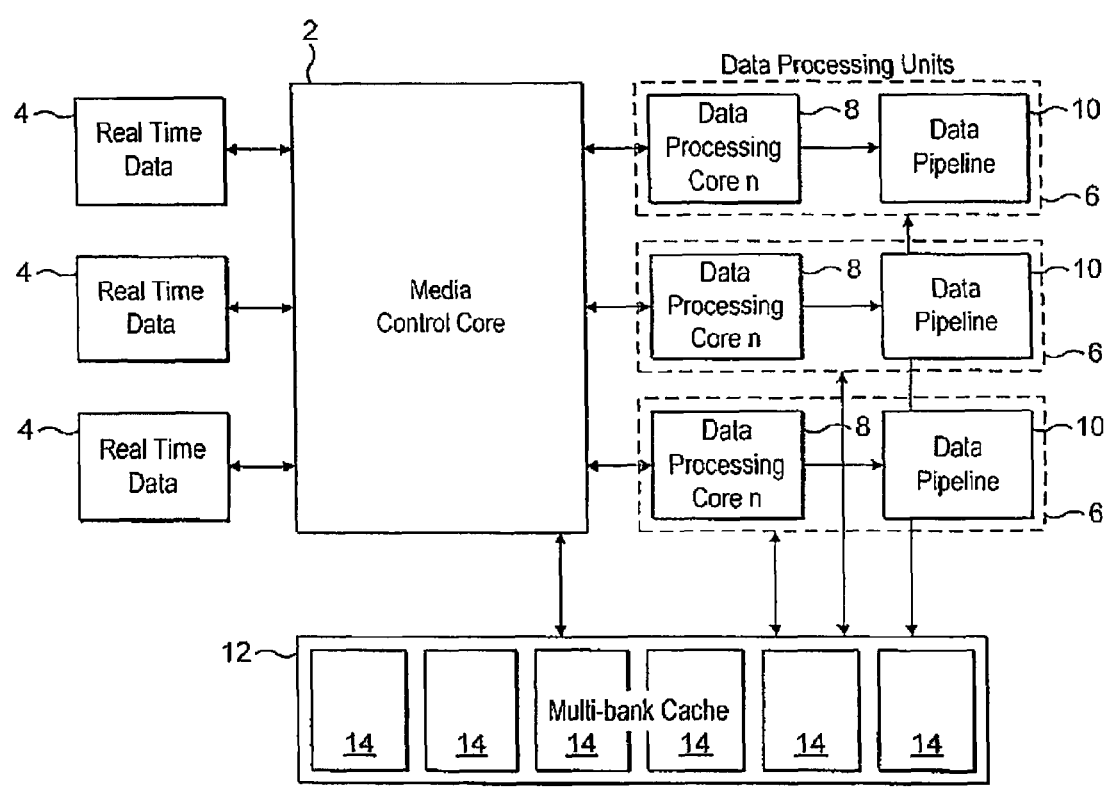
FIG. 1 shows a block diagram of an example of a multi-threaded processor system.

A plurality of data processing pipeline units 6 is also connected to the media control core. There may be one or many of these and there will usually be fewer than the number of data inputs 4. Each pipeline unit 6 comprises a data processing core 8 and the downstream data pipeline 10 which performs any post processing required and provides the output.

The inputs and outputs to the system FIG. 1 may be real time video inputs and outputs, real time audio inputs and outputs, data sources, storage devices etc.

The media control core is a multi-threading unit which directs data from the inputs 4 to the data processing cores 8 or to storage and subsequently provides data for outputs. It is configured so that it can switch tasks at every clock cycle. Thus, on each clock cycle it checks which of the execution threads provided at the inputs 4 have all the resources required for them to be executed, and of those, which has the highest priority. Execution of the threads which are capable of being performed can them commence.

The resource checking is performed repeatedly to ensure that threads do not stall.

In accordance with embodiments of the invention, threads which are to be synchronised are able to indicate to the media control when they encounter synchronisation points so that synchronisation can be controlled by the media control core. Thus, when two or more threads which are intended to be synchronised are supplied to the media control core it is able to perform the operations necessary to synchronise those threads. The media control core 2 processes instruction for the program of each thread and monitors the state of each thread running. In addition to the normal executing or stalled states (waiting for resource availability) there are two special states (these are known as "wait for sync start" and "wait for sync end"). In these states no processing is done since execution is paused at that point.

Figure 2:
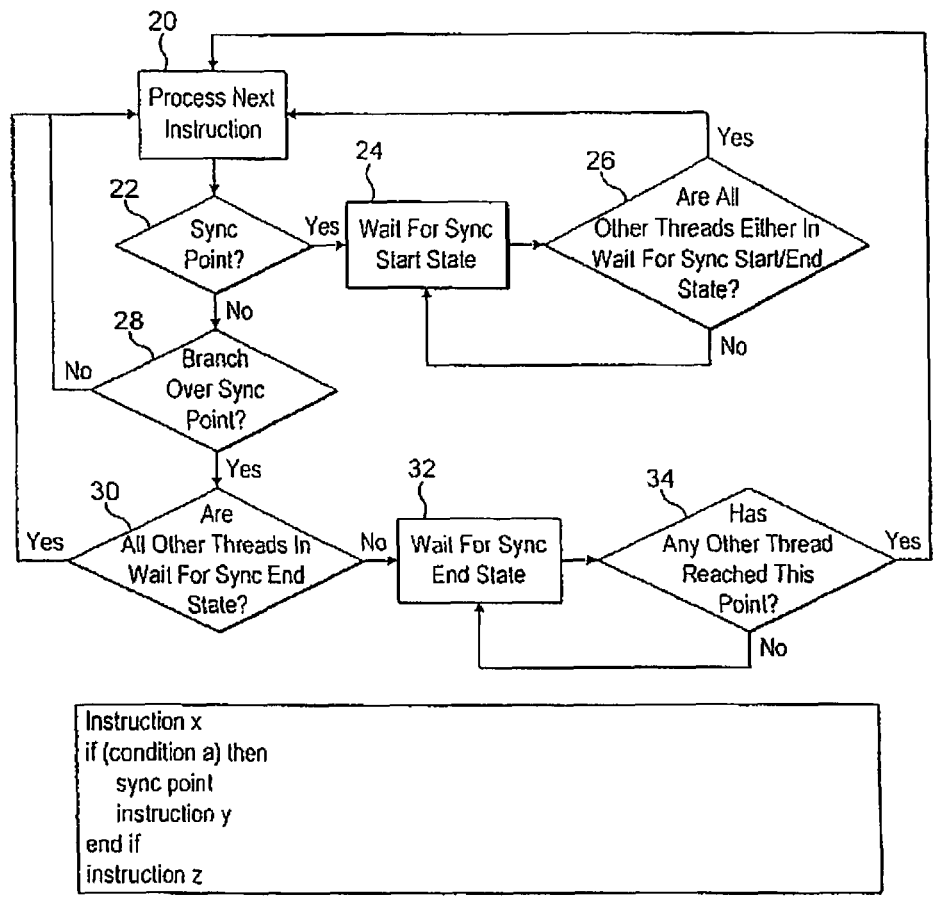
FIG. 2 shows a flow diagram of the decision logic required for each thread in an embodiment of the invention.

The operation of the synchronisation points is explained in more detail with reference to FIG. 2. At 20, the media control core identifies that for a particular thread, it can now process the next instruction. Its first task is to determine whether or not that instruction includes a synchronisation point at 22. If there is a synchronisation point, then the executing thread moves to the wait for sync start state at 24. This state causes the media control core to repeatedly examine all other threads to determine whether or not they are in the wait for sync start/end states at 26. If they are not all in one of these states, then the system loops around repeatedly checking until all the threads to be synchronised are stalled. Once all other threads are in one of these states, the media control core can again process the next instruction at 20 and again looks for a sync point at 22. If the determination is that there is not a sync point, a determination is made as to whether or not a thread has branched over a sync point at 28. If no such branch has taken place, then the system goes back to 20 to process the next instruction.

If the system has branched over a sync point then bits are set to indicate to the MCC that a branch over a synchronisation point has occurred and a determination is made as to whether all other threads are in a wait for sync end state at 30. If they are, indicating that the branched thread is the only thread preventing recommencement of execution of the other threads, then the next instruction is processed at 20. If all other threads are not at the wait for sync end state then a loop is entered in which the executing thread is in the wait for sync end state at 32 and determines whether other threads have reached the sync end state point at 34. Once another thread has reached this point, the system loops back to process the next instruction at 20.

The detection of synchronisation points and branch points can take place in the media control core 2 in response to data included in the thread by its compiler. Alternatively, the information can be fed back to the media control core via the data processing cores 8 as they process instructions.

A distinction between the wait for sync start date and the wait for sync end state is that the wait for sync start state occurs when a synchronisation point is processed in the normal flow of a thread.

The wait for sync end state is entered if a branch instruction is processed that is known to branch over a sync point whether or not any other thread reaches the same point in the program. Thus, once a thread has branched over a sync point, it is effectively stalled until another thread has caught up with it in execution, i.e., has reached the same point in the program.

An example code fragment which traces through a possible execution sequence before threads is shown in FIG. 3. Threads 0 and 2 execute a conditional code whilst codes 1 and 3 skip it. The effect of this code block with the sync point when embodying the invention is to pause all threads in either wait for sync start or wait for sync end states after entering the conditional loop or branching around it. At this point, threads 0 and 2 can resume execution by executing instruction Y. They should preferably be restarted simultaneously and executed at the same rate. Threads 1 and 3 cannot resume execution until either thread 0 or 2 reaches instruction Z.

It will be appreciated from the above that the present invention does enable multiple executing threads to be executed with branch points whilst maintaining synchronisation.

Figure 4:
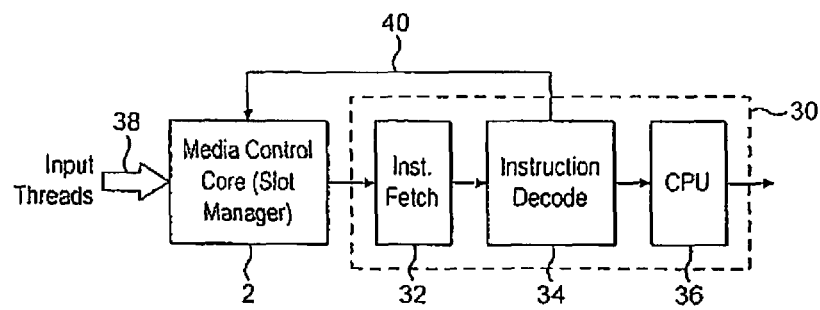
FIG. 4 shows a block diagram of the MCC and data processing unit of FIG. 1.

A more detailed block diagram of the MCC 2 and a data processing unit 30 is shown in FIG. 4. In this, the MCC 2 receives a plurality of input threads 38. For example, it may receive 16 input threads. Of these 16 threads, 4 are to be synchronised and include appropriate synchronisation points in their instructions.

The MCC 2 will determine if the resources required for the four threads to be synchronised are available and if they are will commence execution of these threads. In a single processing unit system as shown in FIG. 3 the treads will be provided cyclically to the data processing unit 30, for example, one instruction in turn from each thread will be supplied to the data processing unit. An instruction fetch unit 32 fetches instructions from each thread in turn as provided by the MCC 2 and supplies them to an instruction decode unit 34, which decodes them and can then send them onward to a CPU 36.

The MCC 2 includes a bank of registers, one register for each thread it is managing. Each register stores a plurality of bits indicating the status of various aspects of its respective thread. The registers each include bits which are set to indicate whether a thread is in a wait for sync start or wait for sync end state. This data enables the MCC 2 to monitor the synchronisation state of the threads and determine whether or not the threads are currently synchronised or are waiting to reach synchronisation by being in a wait for sync start or wait for sync end state.

The MCC 2 receives data to update the registers it contains for each thread via a feedback path 40 from the instruction decode unit 34. This is able to recognise when a thread branches over a section of code and therefore that this thread needs to be put in a wait for sync end state while it waits for the other threads to reach the end of the branch or a sync point within the branch. It also recognises when a thread executes the code which can be branched over and puts the thread into a wait for sync end state at the end of the section of code, or at a sync point within the section of code. This state is also fed back to the MCC 2 and stored in the register for that thread.

When a thread is put into a wait for sync start/end state, the MCC recognjses that other threads could therefore be executing in the slot that had previously been assigned to the stalled thread. It therefore switches in another of the 16 threads it has available for execution. When the threads to be synchronised have all reached the synchronisation point, this is recognised and the MCC 2 will determine whether or not the resources they require to continue execution are available, and whether any other threads have a higher priority for execution. At an appropriate time, execution of the threads to be synchronised is recommenced.

When a thread for use in an embodiment of this invention is compiled, the compiler detects where sync points occur in the thread and includes instructions in the compiled thread to indicate the presence of a sync point to the MCC. Where there are branches, the compiler must determine whether a branch includes a sync point. If it does the alternative branches, if they do not contain corresponding sync points have instructions included in them to indicate to the MCC that they have branched over a sync point, and to pause execution at the end of the branch.

What is claimed is:

1. A method for synchronising execution of threads on a multi-threaded processor, comprising:
    pausing execution of a first thread in response either to the first thread reaching a synchronisation point, or that the first thread is to branch over a section of code which includes the synchronisation point;
    waiting for at least one other thread with which the first thread is intended to be synchronised to reach the corresponding synchronisation point or to require branching over the section of code;
    resuming execution of the first thread before resuming execution of the at least one other thread, if the first thread reached the synchronization point and the at least one other thread branched over the section of code containing the synchronization point; and
    simultaneously executing both the first thread and the another thread after the first thread clears the section of code over which the at least one other thread branched.

2. The method according to claim 1, further comprising entering a wait for synchronization start state for the first thread responsive to reaching the synchronisation point.

3. The method according to claim 2 further comprising repeatedly checking whether the at least one other thread with which the first thread is to be synchronised has also paused.

4. The method of synchronizing threads of execution of claim 1, further comprising allocating execution resources used for executing the first thread to executing another thread, in response to pausing the first thread.

5. The method of synchronizing threads of execution of claim 1, wherein the pausing of the first thread comprises entering the first thread into a wait for synchronization start state, and further comprising beginning execution of the first thread only after all threads of a set of threads whose execution is to be synchronized with the first thread are in either the synchronization start state or in a synchronization end state, entered responsive to branching over the synchronization point.

6. A multi-threaded processor comprising:
    an execution unit comprising a plurality of execution cores, the execution unit comprising instruction decoders configured to decode instructions in respective programs of instructions for a plurality of threads, the instruction decoder configured to detect synchronization points and branch instructions in the programs of instructions, the execution unit capable of simultaneous processing of instructions from a subset of two or more threads selected from the plurality of threads; and
    a controller configured to track status for the plurality of threads and synchronize execution of a set of synchronized threads by pausing execution of a first thread from the set of synchronized threads, responsive to the first thread reaching or branching over a synchronization point, and continuing to execute other threads from the set of synchronized threads at least until each of those threads reaches the synchronization point or branches over the synchronization point, and then restarting scheduling of execution of threads that reached the synchronization point before restarting any of the threads that branched over that synchronization point, wherein the execution unit is configured to signal reaching synchronization points and branch points to the controller.

7. The multi-threaded processor according to claim 6, wherein the controller is configured to assign each thread that reaches the synchronisation point to a wait for sync start state.

8. The multi-threaded processor according to claim 7 wherein the controller is further configured to repeatedly check whether all of the threads of the set of synchronized the threads are paused, after the first thread has reached the synchronized point or branched over the synchronization point.

9. The multi-threaded processor of claim 6, wherein at least one of the one or more instruction decoders are provided with the controller to detect presence of synchronization points and branch points within the programs of instructions being executed.

10. The multi-threaded processor of claim 6, wherein the execution unit comprises a plurality of pipeline units, each configured with access to a multi-banked cache.

11. A multi-threaded processor comprising:
    a plurality of processing cores, each capable of being controlled by a thread of program instructions;
    an instruction decode unit configured for decoding instructions to be executed on one or more of the plurality of processing cores;
    a controller shared among the plurality of processing cores, the controller coupled with a non-transitory memory for storing status information on a set of threads being managed by the controller, wherein
    the instruction decode unit is coupled to the controller through a feedback path, and is configured to indicate to the controller that a first thread of program instructions currently being executed on the plurality of processing cores is to branch over a section of the program instructions, and the controller is configured to determine whether the first thread should be halted for synchronization with other threads being managed by the controller and
    the controller configured to put another thread, which is to be synchronized with the first thread, into the wait for synchronization start state, responsive to receiving an indication that this thread reached a synchronization point within the section of program instructions over which the first thread is to branch, and to condition the starting of the thread that reached the synchronization point on availability of resources to simultaneously execute all of the threads that reached the synchronization point.

12. The multi-threaded processor of claim 11, wherein the controller is configured to maintain a state for each thread being managed, the state selected from a set comprising a wait for synchronization start and a wait for synchronization end state, the controller configured for putting the first thread in the wait for synchronization end state responsive to determining that the first thread should be halted for synchronization.

13. The multi-threaded processor of claim 11, wherein the controller is further configured to maintain a state for each thread being managed, the state selected from a set comprising a wait for synchronization start and a wait for synchronization end state.

14. The multi-threaded processor of claim 13, wherein the controller is further configured to start the thread that reached the synchronization point, in response to determining that all of the threads that are to be synchronized have entered either wait for synchronization start or wait for synchronization end states.

* * * * *